Jan. 16, 1934.                L. CAMPBELL, JR                1,943,287
BRAKING SYSTEM FOR LAND VEHICLE TRAINS
Filed Aug. 12, 1929
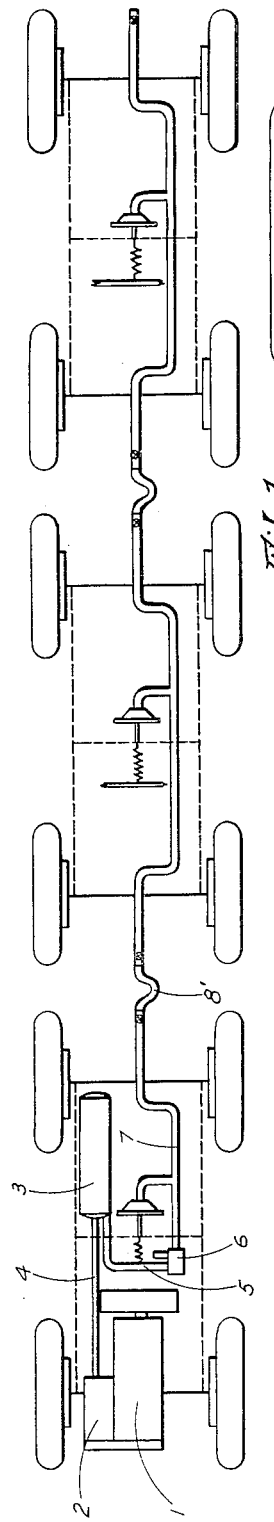
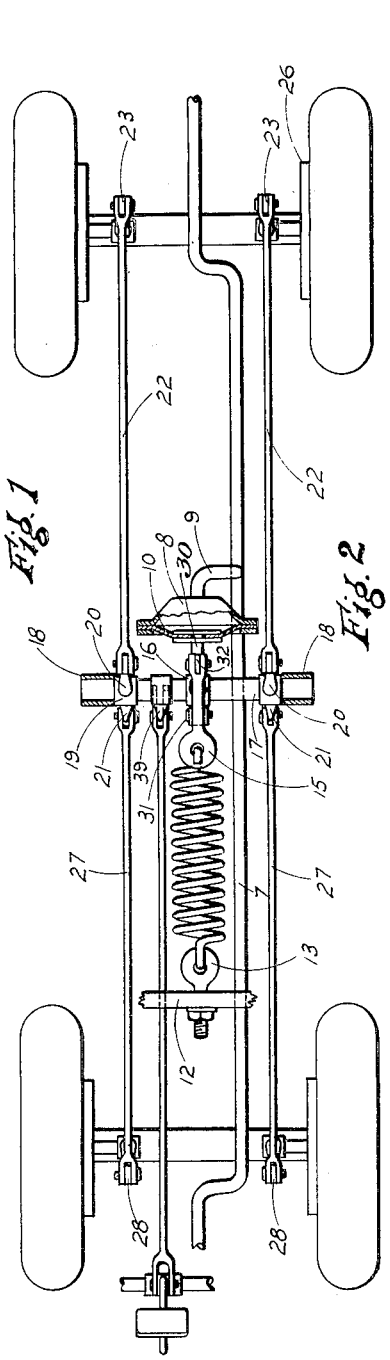
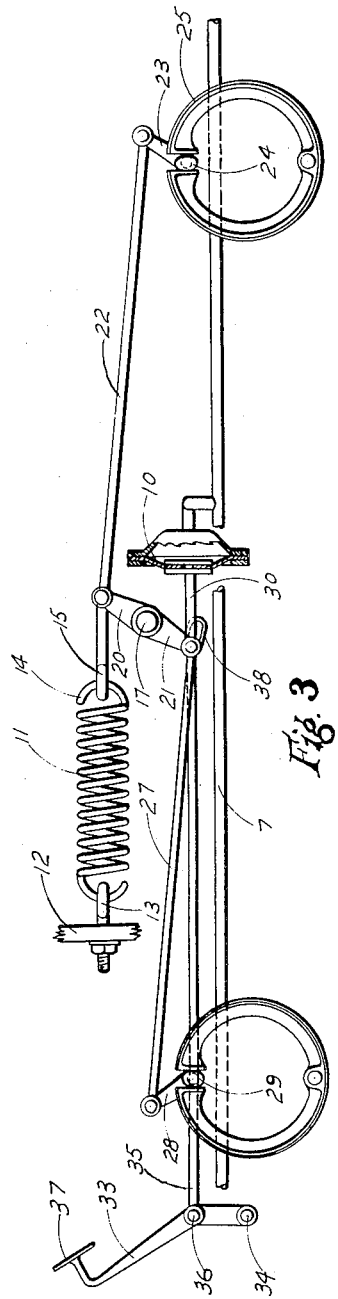
INVENTOR
LORN CAMPBELL JR.
BY
Richey & Watts
ATTORNEY Patented Jan. 16, 1934

1,943,287

UNITED STATES PATENT OFFICE 1,943,287

BRAKING SYSTEM FOR LAND VEHICLE TRAINS

Lorn Campbell, Jr., Cleveland, Ohio

Application August 12, 1929. Serial No. 385,199

1 Claim. (Cl. 188—3)

This invention relates to air controlled braking systems particularly adapted for use upon land vehicle trains.

Land vehicle trains usually comprise a tractor or driven vehicle, together with one or more trailers or drawn vehicles. The tractor is usually equipped with one or more mechanical brake systems, but it has not always been convenient to apply a satisfactory braking system to the drawn vehicle. In the past, however, this necessity has been minimized due to the fact that most land vehicle trains were of the freight carrying type and were operated at night. It may be obviously seen that a vehicle train which is to be operated during the daytime through heavy traffic and the like, must be under complete control of the driver, otherwise the mobility thereof will be considerably reduced.

By my invention I intend to provide a land vehicle train, especially adaptable for transporting passengers, wherein the danger commonly present in land vehicle trains in common use is reduced to a minimum.

I accomplish this purpose by providing each of the vehicles with an individual braking system so operated, that the various brakes on the vehicles are under complete control of the driver of the driven vehicle, and wherein the brakes on the various vehicles act synchronously and are such that should breakage or leakage in the controlling line occur, the brakes on all vehicles will be actuated bringing the various vehicles to a stop, thereby eliminating the danger which might otherwise be caused by a severance of the control line or the like.

In the accompanying drawing I have illustrated such a system, wherein:

Fig. 1 is a diagrammatic view of a land vehicle train embodying my invention;

Fig. 2 is a plan view of a vehicle running gear mostly diagrammatic illustrating more in detail the mechanism of my invention; and Fig. 3 is a view in side elevation of my invention.

Referring now to the drawing wherein like parts are designated by like character references and more particularly to Fig. 1, a motor 1 is indicated which has operatively coupled thereto an air compressor 2 adapted to be operated when the motor is in operation. Air is compressed in the air compressor and conducted to a storage tank 3 through the air line 4. Another air line 5 extends from the storage tank 3 to a control valve 6. The control valve is connected to the main air line 7 which extends throughout the length of the train, certain portions intermediate the vehicle being coupled by flexible couplings 8'.

The system as applied to the vehicles herein shown and described, is of a type wherein the air pressure is more particularly adapted to release the brakes on the separate vehicles, and wherein a reduction of pressure in the main line is adaptable to cause the brakes to be applied.

As best shown in Figs. 2 and 3 the air line 7 is connected to a bell shaped housing 8 by a relatively short branch conduit 9, and the open end of the housing 8, is closed by a flexible diaphragm 10.

The brakes are adapted to be set, in the normal position, by means of a large heavy helical spring 11, which is secured to the frame 12 by an adjustable bolt 13 and which has the other end 14 engaged by a link 15 which is pivotally secured to the end 32 of a lever 16 which is keyed upon a shaft 17. The shaft 17 may extend transversely across the chassis and be journaled in suitable bearings 18 disposed on the frame which is not shown.

A pair of levers 19, are also keyed upon the shaft adjacent the bearings 18, and each of the levers is provided with upwardly extending arms 20 and a downwardly extending arm 21. The arms 20 are adapted to be pivotally connected to rods 22 and extend to the brakes upon the rear wheels where they are pivotally connected to brake cam levers 23 adapted to operate brake cam lever 24. Rotation of the brake cams causes the same to spread the end of the shoe 25 forcing the brake into braking connection with the brake drum 26 carried by the wheels.

The arms 21 which extend downwardly are connected to rods 27 which extend forward and are connected to brake levers 28 which are adapted to operate cams 29 on the brakes to the front wheels similar to those on the rear wheels.

The brakes in their normal position are adapted to be set by the tension of the spring 11, which pulls the link 15 and lever 16, said lever being similar to the lever 19, with the arms 31 and 32 extending therefrom, to rotate the shaft 17 in a counter-clock-wise direction as viewed in the figures pulling the rods 22 and 27 to apply the brakes.

The influence of the spring 11 is overcome by a short rod 30 which is connected to the diaphragm 10 at one end and which is pivotally secured to the lower end 31 of the lever 16. Pressure in the air line tends to force the diaphragm 10 in a direction to the left as viewed in the figures or outward, forcing the arm against the pressure of the spring 11 to release the brakes.

Obviously, a reduction in pressure in the air line will allow the spring 11 to retract the rods 22 and 27 to apply the brakes according to the amount of the reduction of pressure in the main line.

It may thus be seen that when the vehicles are disconnected from the tractor vehicle, which carries the fluid pressure tank 3, that the brakes will be set. To facilitate moving the vehicle when the brakes are set, I provide an auxiliary release lever 33 which is pivoted to the frame at 34 and which has a rod 35 secured to the intermediate portion of the lever at 36. Pressure upon the pedal 37 will cause the rod 35 to be reciprocated longitudinally to the left wherein the loop 38 at the end of the rod which engages the end of a lever 39 which is keyed to the shaft 17 and depended therefrom, will cause the loop to engage the end of the lever rotating the lever and the shaft against the retractive efforts of the spring 11 releasing the brakes. It may thus be readily seen that the vehicles may be moved at will. The loop 38 permits the shaft to be rotated without moving the lever 33.

I contemplate providing each of the vehicles with an assembly similar to that shown in Figs. 2 and 3. It may thus be seen that the pressure on the brakes of the various vehicles is dependent upon the amount of pressure in the main line 7, which is under the control of the operator by the valve 6. The valve 6, the operative parts of which are not shown, is of ordinary design and under operation will discharge air from the main line to the atmosphere when the foot pedal is depressed whereby the conduit 5 is cut off from the main tank 3. If desired this valve may be so constructed that the pressure may be materially reduced throughout the line in varying degrees depending upon the will of the operator. Release of the lever controlled by the operator allows the air pressure to come up in the main line operating the diaphragm 10 to rotate the shaft 17 against the pressure exerted by the spring 11 releasing the brakes on the various wheels.

Having thus described my invention, I am aware that numerous and extensive departures may be made therefrom, but without departing from the spirit of my invention.

I claim:

In a land vehicle train including a tractor and a trailer, a braking system comprising brakes and brake drums for wheels of the tractor and trailer, and means including levers on each vehicle for simultaneously actuating the brakes of such vehicle, air compressor means including a pressure storage tank on the tractor, housings on each vehicle having flexible diaphragms, a valve controlled air line connecting the compressor means with each housing, the diaphragm on each vehicle being connected to the brake actuating means on such vehicle, spring means on each vehicle operatively associated with the brake actuating means of such vehicle to apply the brakes whenever the air pressure in the air line falls below a predetermined pressure, and mechanically operable means having a lost motion connection with the brake actuating means on the tractor to release the brakes thereon after they have been actuated into braking position coincident with a drop in air pressure.

LORN CAMPBELL, Jr.